(12) United States Patent
Edward et al.

(10) Patent No.: US 6,697,315 B1
(45) Date of Patent: Feb. 24, 2004

(54) MEDIUM, SYSTEM AND METHOD FOR OPTICAL RECORDING

(75) Inventors: Bormashenko Edward, Ariel (IL); Pogreb Romah, Ariel (IL); Sheshnev Avigdor, Shiloh (IL); Abraham Katzir, Tel Aviv (IL); Bormashenko Yelema, Ariel (IL)

(73) Assignee: Polytris Ltd., Ariel (IL)

( * ) Notice: Subject to any disclaimer, the term of this patent is extended or adjusted under 35 U.S.C. 154(b) by 486 days.

(21) Appl. No.: 09/628,111

(22) Filed: Jul. 27, 2000

(51) Int. Cl.[7] .................................................. G11B 7/00
(52) U.S. Cl. .................... 369/100; 369/275.1; 369/47.1
(58) Field of Search ............................... 369/100, 275.1, 369/275.2, 275.3, 275.4, 283, 47.1, 53.1, 59.1

(56) References Cited

U.S. PATENT DOCUMENTS

| | | | |
|---|---|---|---|
| 4,864,537 A | | 9/1989 | Michl et al. |
| 5,297,076 A | | 3/1994 | Jefferson et al. |
| 5,491,003 A | * | 2/1996 | Akahira ...................... 369/288 |
| 5,698,284 A | * | 12/1997 | Kubota et al. ........... 369/275.5 |
| 5,889,756 A | | 3/1999 | Ichihara et al. |
| 5,936,878 A | | 8/1999 | Arsenov et al. |
| 6,057,020 A | | 5/2000 | Ueno et al. |
| 6,500,602 B1 | * | 12/2002 | Magnitakil et al. ......... 430/321 |

* cited by examiner

*Primary Examiner*—Muhammad Edun
(74) *Attorney, Agent, or Firm*—G.E. Ehrlich (1995) Ltd.

(57) ABSTRACT

An optical recording medium, an optical recording system and an optical recording method, based on the suppression of the absorption coefficient of a polymeric film at selective wavelength in the infra-red as a result of irradiation the film with a beam of a $CO_2$ laser. The magnitude of the effect, which is observable only above a threshold power of the laser beam, is related to the energy deposited by the writing beam. Optical recorded information is stored in the modified absorbance spectrum of the polymer and is read by an infra-red photometric device in the transmission mode.

48 Claims, 5 Drawing Sheets

MEDIUM, SYSTEM AND METHOD FOR OPTICAL RECORDING

BACKGROUND OF THE INVENTION

The present invention relates generally to the use of polymers in data storage and more specifically to their use as a medium for optical recording and retrieval of data, which is based on light induced modification of their absorption coefficient in the infra-red (IR).

The data storage requirements of new computers and multimedia applications of computers are very large. New and improved, compact, low cost, very high capacity memory devices are required. These memory devices should be able to store many giga-bytes of information, and should randomly retrieve such information at very fast random access speeds demanded by practical applications of modern computing and data processing.

An optical memory offers the possibility of packing binary-stated information into a storage medium at very high density, each binary bit occupying a space only about one wavelength of the writing beam in diameter. This leads to a total capacity of about $10^{11}$ bits for a reasonably sized ($\approx 25$ cm in diameter) two-dimensional optical storage medium when a writing beam with diameter of about 1 micrometer is used.

At the present three general types of optical recording medium exist, namely ablative recording medium, phase recording medium and amplitude recording medium.

The first type is based on a recording mechanism, which is essentially "mechanical" in nature and utilizes the energy of an adsorbed laser beam to either melt or to actually ablete the material of the recording medium. The result is that dips and even holes are formed which are used to modulate the intensity of the read out laser beam. The current "write once read many times" CDs belong to this type.

The second type utilizes light-induced phase changes of the recording media, which modify their index of refraction for the writing mechanism. To this type belong the disclosures of U.S. Pat. No. 4,864,537 to Michl, et al. and U.S. Pat. No. 5,889,756 to Ichihara, et al.

In both cases, the light induced phase changes which affect the refractive index of the medium are accomplished due the local heating of the substrate by the writing laser beam.

The third type refers to photo-induced changes in the absorption coefficient of the recording material.

To this type belong the disclosures in U.S. Pat. No. 5,297,076 to Jefferson, et al. and U.S. Patent No. 5,936,878 to Arsenov, et al.

A common disadvantage of all these types of currently available optical recording and retrieval media is the need for "chromophores" e.g., light absorbing particles dispersed in the matrix of the recording medium which will absorb the energy of the writing beam and enable its interaction with the medium.

This is so because the basic constituents of current optical recording substrates are colorless and hence are transparent to the light of the writing beam in the visible, thus light is not absorbed sufficiently to provide the local amount of the energy dissipation needed for the writing effect to take place.

As a result one has to enhance light absorption at the desired wavelengths by adding light absorbing material into the polymeric matrix which constitute the body of the optical recording medium, as e.g., in U.S. Pat. No. 6,057,020 to Ueno, et al.

Consequently there exist a widely recognized need for an optical recording medium which would overcome this disadvantage of presently known systems as described above.

The present invention provides a recording medium, which belongs to the third type of optical recording media which were mentioned above. It also relates closely to the problem of losses in the connections of optical elements intended for use in middle and far infra-red (IR) bands.

Most if not all adhesives now in use for optical connections are based on organic compounds that have characteristic absorbance peaks in IR (see e.g. in: Liang C., Krimm S., Sutherland G., "Infrared Spectra of Polymers". Journal of Chem. Phys., 25, 543, 1956).

These absorbance peaks in middle and far IR, which are inherent for organic molecules, reduce the optical transmission at the optical contact, thus the elimination of these peaks is desired.

The process of attenuation of absorbance peaks in polymers under thermal exposure was studied by many investigators. Disappearance of absorption at 2012 $cm^{-1}$, which is inherent for ketenimine groups on heating polymethacrylonitrile at 90° C. in cyclohexanone solution, was studied in classical works of Grassie and Mc.Neill (Grassie N. Mc.Neill, J. Polymer Science, 33, 171, 1958 and Grassie N., Mc.Neill, J. Polymer Science, 39, 211, 1959 ).

Grassie and Mc.Neill studied different polymers and discovered the effect of disappearing of absorption peaks under heating procedure. They related the effect to the decomposition of polymer and changes in its chemical structure.

The process of peak decay in the IR is attended with changes in the polymer's color in tile visible (e.g. from colorless for undegraded polymethacrylonitrile to orange-red for the same material heated during 9 hours at 100° C.), so the effect is also known as polymer "coloration".

A technique related to this effect is that of laser marking, see e.g. Tracy Reganall and Mark Wasilenski, "Pigmenting benefits laser marking of thermoplastics" in BASF Plastics, 224 October 1998

The absorbance changes due to degradation of polyethylene and epoxy resin films have been studied previously. Fourier transform infrared (FTIR) and Raman spectroscopy were effectively used in the study of polyethylene degradation by Sammon, et al. (Sammon C., Yarwood J., Everall N., "A FTIR Study of the Effect of Hydrolytic Degradation on the Structure of Thin PET films", Polymer Degradation and Stability, 67, 149–158, 2000) and in the study of epoxy resin degradation by Farquhrson, et al. (Farquharson S., Bassilakis R., Ditaranto M., Haigis J., Solomon P., Smith W., Ebeling Th., "Measurement of thermal degradation in epoxy composites by Fourier transform Raman spectroscopy", Proceedings of SPIE, vol. 2072, 319–331, 1994).

SUMMARY OF THE INVENTION

We have discovered that changes in the absorbance spectra of a variety of polymeric films, similar to these which were disclosed before, are induced by IR radiation produced by a $CO_2$ laser.

These changes, which are related to the intensity of the irradiating beam and to the duration of the irradiation are used to mark a written zone, which is later subjected to an absorbance measurement for the reading of the recording.

The present invention discloses an optical recording medium, an optical recording system and a method for optical recording and reading in the IR.

In accordance with the present invention there is provided an optical recording medium comprising: (a) a first transparent substrate having an optically flat face; and (b) a recording layer which includes a polymeric film overlaid on the optically flat face of the first transparent substrate.

In accordance with the present invention there is provided an optical recording and retrieval system comprising: (a) an optical recording medium having at least one absorbance band in the spectral region of about 1 micrometer to about 20 micrometer; (b) a first infra-red light source to irradiate on a portion of the optical recording medium; and (c) a mechanism to determine changes in the at least one absorbance peak at the irradiated portion of the optical recording medium.

In accordance with the present invention there is provided a method for optical recording of a plurality of data points data storage comprising the steps of: (a) providing a polymeric layer having at least one absorbance peak in the spectral region from about 1 micrometer to about 20 micrometer, for each data point: (b) producing a light pulse having a power related to a value of said each data point; and (c) changing the at least one absorbance peal of the polymeric layer by irradiating a respective portion of the polymeric layer with the light pulse.

In accordance with the present invention there is provided a method for retrieval of an optical recording comprising the steps of: (a) providing a polymeric, a at least one absorbance peak in the infra-red of a portion whereof has been suppressed by irradiation with a first beam of light; and (b) determination the amount of said suppression of the at least one absorbance peak at the at least a portion of the polymeric layer.

It is the object of the present invention to provide an optical recording medium that is based on simple, common, and cheap polymers.

It is another object of the present invention to provide an optical recording medium which does not need the incorporation of light absorbing dyes.

It is still another object of the present invention to provide an optical recording medium in which the writing beam uses little power.

It is yet another object of the present invention to provide an optical recording medium with high recording density.

Other objects of the invention will become apparent upon reading the following description taken in conjunction with the accompanying drawings.

DETAILED DESCRIPTION OF THE INVENTION

We have discovered that modifications in the absorbance peaks of polymeric materials can be induced by IR radiation, produced by a $CO_2$ laser. Namely, the absorption coefficient of the polymer at certain peak wavelengths decreases as the result of the laser irradiation in a manner that is related to the power of the laser and to the time of the exposure.

This novel optical bleaching effect is used in the present invention for optical recording on polymeric layers.

The embodiments presented herein are not intended to be exhaustive and to limit in ally way the scope of the invention, rather they are used as examples for the clarification of the invention and for enabling of other skilled in the art to utilize its teaching.

A setup for energy transfer of an excimer laser to evaporate a polymeric film overlaid on a transparent substrate is described in U.S. Pat. No. 5,292.559.

Figure 1:
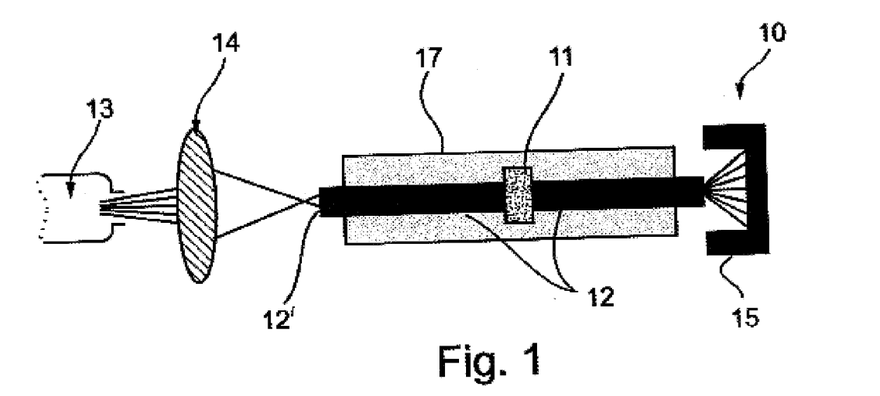
FIG. 1 shows a setup for optical recording on a polymeric film.

FIG. 1 depicts a general experimental setup for optical marking on a polymeric film accordinig to a first embodiment 10 of the present invention: A thin polymeric film 11 is clamped between optically flat surfaces of two IR waveguides 12 which are partially confined within an envelope 17 (either hollow or solid) from which oxygen is excluded to prevent the oxidation of the polymer.

Light from an IR light source, preferably a $CO_2$ laser 13 is collimated by a lens 14 on the entrance face 12' of one of waveguides 12 and is absorbed by the polymeric layer 11.

The position of the beam on entrance face 12' is located by a precise XYZ translator stage (not shown) which moves laser 13 relative to envelope 17.

The light transmitted by film 11 is conducted by the second waveguide 12 to a power meter 15 which monitors the power of the transmitted laser beam. The output of the power meter 15 can be used to regulate the power of light source 13 via a feedback loop (not shown).

Figure 2:
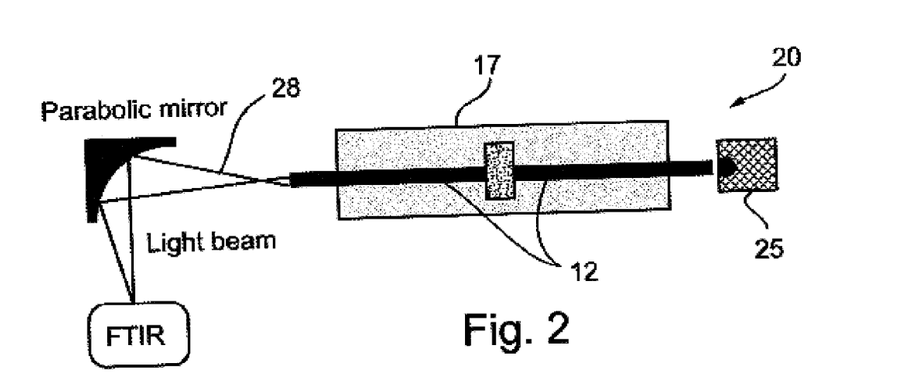
FIG. 2 shows a setup for optical reading of the recording on a polymeric film.

FIG. 2 depicts an experimental setup for observing changes in at least one of the absorption coefficients of the polymeric film 11 which were induced by the irradiation with the light of the light source 13 according to a second embodiment 20 of the present invention:

The observing mechanism includes the mounting of the physical unit having film 11 confined in its envelope 17 with the two protruding waveguides 12, into or outside a sample compartment of an IR spectrometer (e.g. an FTIR) which produces a reading beam 28 and measuring the absorption spectrum of the irradiated film in the spectral range of 1–20 $\mu$m with a detector 25 which is sensitive to light of wavelength at this range.

The following are non-limiting examples for optical recording and the corresponding reading according to the present invention:

EXAMPLE 1

Recording on Thremoplastic Polymers

Polyethylene was chosen to represent this group. Thin polyethylene films were deposited at the ends of infrared silver halide AgBrCl fibers. Silver halide fibers were used as waveguides, being highly transparent in the middle and far infrared bands of a spectrum.

These fibers were extruded from silver halide crystals; the high quality of input and output fiber's surfaces was achieved by microtome cutting as shown by Nagli L., Bunimovich D., Shmilevich A., Kristianpoller N., and A. Katzir, in "*Optical Properties of Mixed Silver Halide Crystals and Fibers*", Journal of Applied Physics, 74 (90). 1 November, 5737, 1993.

Pieces of AgBrCl fibers with diameter of 0.9 mm and with a length of 5 cm were used as waveguides 12.

The polymer was middle density polyethylene MDPE M3804RU/RUP, (manufactured by Thai Polyethylene Co. LTD). This sort of polyethylene is produced in powder form, which lowers the melting point of polymer and enables the dip-coating deposition of polymer on the end of the infrared fiber.

Figure 3:
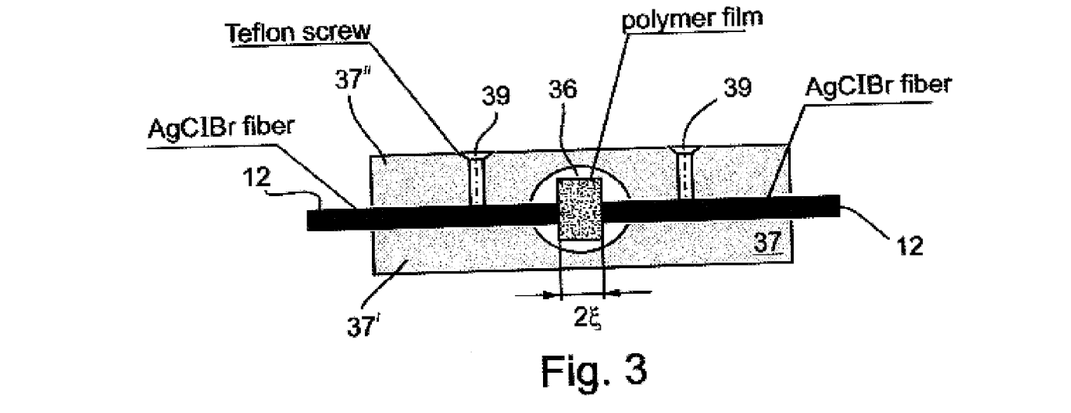
FIG. 3 shows a detailed view of the optical recording medium.

A connector 37 for gluing the AgBrCl fiber's faces with a thin layer of polymer in between is shown in FIG. 3. Connector 37 is a block which is split into two halves 37' and 37", made of titanium alloy that preserves the chemical inertness of all the components enclosed within it.

Each halve 37', 37" of connector 37 has a polished face with a semicircular groove (not shown) along its face which accommodates about half of the thickness of an AgBrCl fiber.

In the middle of each halve 37', 37" of connector 37 there is a cavity 36 which accommodates the spillover of the adhesive. The two halves 37', 37" of connector 37 are clamped together (with the grooves of each halve pointing toward each other) by Teflon screws 39.

To bond the two waveguide pieces with polyethylene, the polymer was heated up to 140° C., and fibers tips were dip-coated by the MDPE melt, then the fibers were guided toward each other in the groove of one halve 37' of connector 37 until they contacted mechanically. The fibers were clamped to hold in place by the other halve 37" of connector 37 which was tightened to the first halve 37' of connector 37 with the Teflon screws 39. The whole assembly was heated to 100° C., adhering the two respective faces of the optical fibers to each other.

The bulk of the polymer which was spilled over the joint and surrounded it prevented oxygen from interacting with the adhering polymer layer.

Samples were exposed to $CO_2$ laser radiation in the setup shown in FIG. 1 starting from small intensities≈0.3 W. After the exposure, the absorbance spectra of the samples were measured in the setup shown in FIG. 2. Then the samples were removed again to the recording setup of FIG. 1 and the amplitude of infrared radiation was increased gradually, then the samples were measured again and vice versa.

This was continued up to values of radiation that caused significant changes in absorbance peaks. The duration of exposure varied from 5 to 20 minutes.

The absorbance spectrum was measured by FTIR spectrometer (Nicolet, model 5PC), having a parabolic mirror and highly sensitive detector (EG&G Optoelectronics, J15-D16). The waveguides 12 of block 37 was located along the path of the light of the instrument.

Figure 4A:
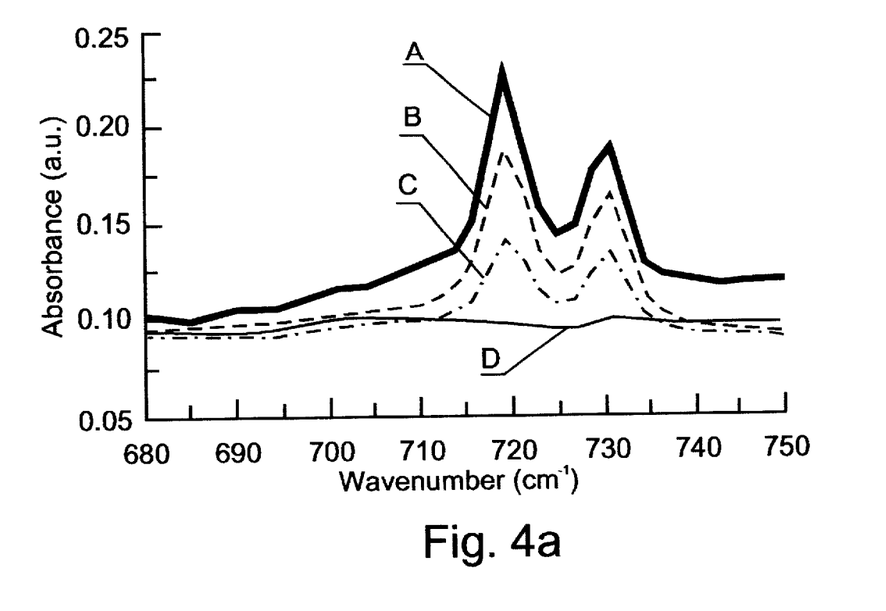
FIGS. 4A and 4B show changes in the absorption spectra of a polyethylene film at different exposures to $CO_2$ laser radiation at two spectral regions.
Figure 4B:
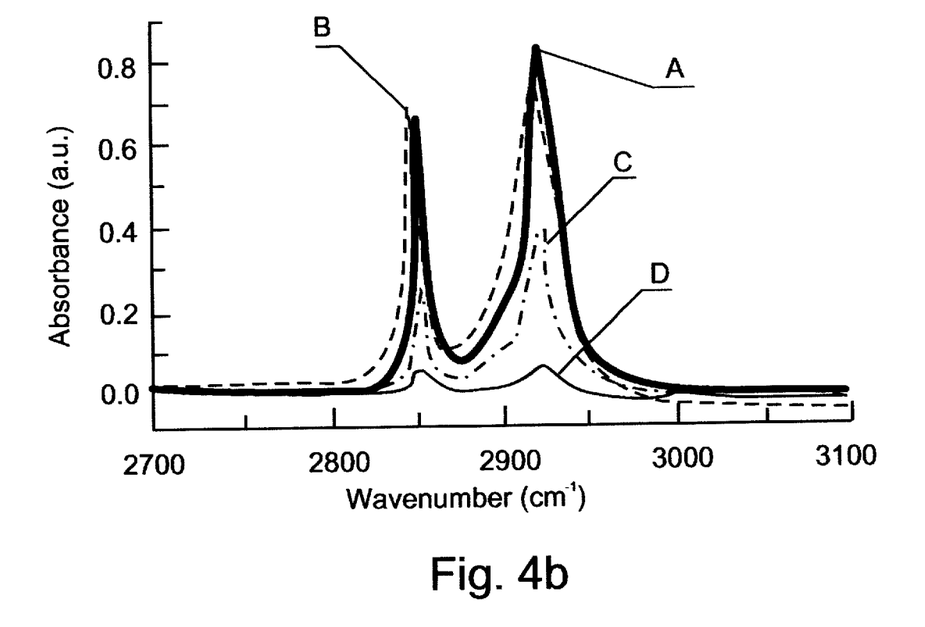

The spectrum of two pieces of AgBrCl fiber of a length of 10 cm was taken as background. The measured spectrum of the fibers attached by the polymeric layer was normalized to background, so the spectrum of the polymer layer has been obtained FIGS. 4A and 4B illustrate changes in the spectra of polyethylene layers which were exposed to different initial values of intensity of infrared radiation for different duration of time. In FIGS. 4A and 4B:

Curve A is the absorbance spectrum of the non-irradiated polymer, curve B is the absorbance spectrum after irradiation with beam power of 3 W for 4 minutes; curve C is the absorbance spectrum after irradiation with beam power of 4.5 W for 5 minutes; curved D is the absorbance spectrum after irradiation with beam power of 4.5 W for 20 minutes.

Position of the peak 720 $cm^{-1}$ is inherent for the rocking vibration of $CH_2$ groups. We have determined that the phenomenon of peak's disappearance is of threshold nature, and the limiting power that causes changes in the area under the absorption peak is about 2.5 W.

Exposure of polymer layers to IR radiation which is weaker than the threshold of 2.5 W doesn't cause changes in peak's area (measured with a very high accuracy) even after the film was irradiated for a very long time.

Peak's position 2850–2960 $cm^{-1}$ (normally two bands as it can be seen at FIG. 4B) is inherent for the stretching vibration of $C_2$ group. The process of disappearance of these peaks has a threshold nature as well, and the limiting energy of infrared radiation was established to be about 4.5 W.

EXAMPLE 2

Recording on Thermosetting Polymers

Epoxy resin DP-125 manufactured by the 3M Corporation was chosen to represent this group. Thin Epoxy resin films were deposited at the ends of infrared silver halide AgBrCl fibers. Silver halide fibers were used as waveguides, being highly transparent in the middle infrared band of a spectrum.

These fibers were extruded from silver halide crystals; the high quality of input and output fiber's surfaces was achieved by microtome cutting as shown by Nagli L., Bunimovich D., Shmilevich A., Kristianpoller N., and A. Katzir, in "*Optical Properties of Mixed Silver Halide Crystals and Fiber*", Journal of Applied Physics, 74 (90), 1 November, 5737, 1993.

Pieces of AgBrCl fibers with diameter of 0.9 mm and with a length of 5 cm were used as waveguides 12.

A connector 37 for gluing the AgBrCl fiber's faces with a thin layer of polymer in between is shown in FIG. 3. connector 37 is a block which is split into two halves 37' and 37", made of titanium alloy that preserves the chemical inertness of all the components enclosed within it.

Each halve 37', 37" of connector 37 has a polished face with a semicircular groove (not shown) along its face which accommodates about half of the thickness of an AgBrCl fiber.

In the middle of each halve 37', 37" of connector 37 there is a cavity 36 which accommodates the spillover of the adhesive. The two halves 37', 37" of connector 37 are clamped together (with the grooves of each halve pointing toward each other) by Teflon screws 39.

To bond the two waveguide pieces with epoxy resin, the fibers tips were dip-coated by the epoxy resin mixed with curing agent, then the fibers were guided toward each other in the groove of one halve 37' of connector 37 until they contacted mechanically. The fibers were clamped to hold in place by the other halve 37" of connector 37 which was tightened to the first halve 37' of connector 37 with the Teflon screws 39 and the epoxy at the bond was left to cure, adhering the two respective faces of the optical fibers to each other.

The bulk of the polymer which was spilled over the joint and surrounded it prevented oxygen from interacting with the adhering polymer layer.

Samples were exposed to $CO_2$ laser radiation in the setup shown in FIG. 1 starting from small intensities≈0.3 W. After the exposure, the absorbance spectra of the samples were measured in the setup shown in FIG. 2. Then the samples were removed again to the recording setup of FIG. 1 and the amplitude of infrared radiation was increased gradually, then the samples were measured again and vice versa.

This was continued up to values of radiation that caused significant changes in absorbance peaks. The duration of exposure varied from 5 to 20 minutes.

The absorbance spectrum was measured by FTIR spectrometer (Nicolet, model 5PC), having a parabolic mirror and highly sensitive detector (EG&G Optoelectronics, J15-D16). The waveguides 12 of block 37 was located along the path of the light of the instrument.

Figure 5A:
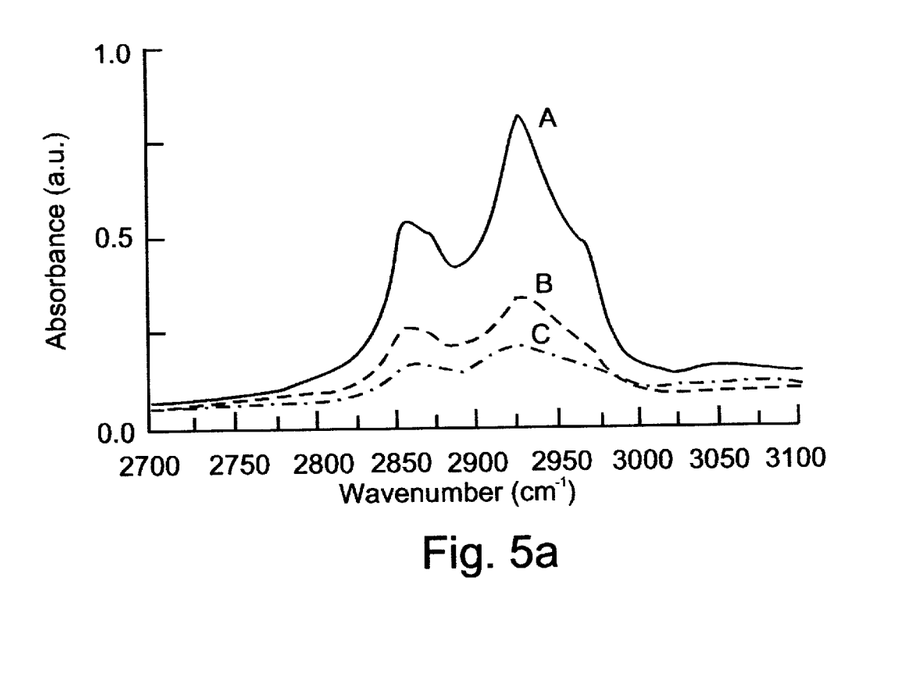
FIGS. 5A and 5B show changes in the absorption spectra of an epoxy resin film at different exposures to $CO_2$ laser radiation at two spectral regions.
Figure 5B:
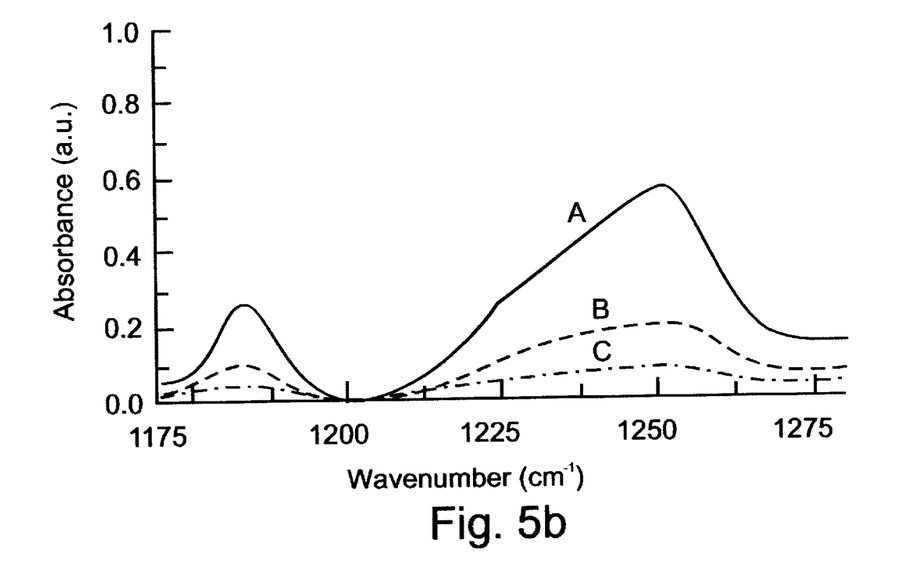

The spectrum of two pieces of AgBrCl fiber of a length of 10 cm was taken as background. The measured spectrum of the fibers attached by the polymeric layer was normalized to background, so the spectrum of the epoxy layer has been obtained FIGS. 5A and 5B, illustrate changes in absorbance spectra of the epoxy resin induced by radiation of $CO_2$ laser. In FIGS. 5A and 5B:

Curve A is the absorbance spectrum of the non-irradiated epoxy resin, curve B is the absorbance spectrum after irradiation with beam power of 1 W for 20 seconds; curve C is the absorbance spectrum after irradiation with beam power of 1 W for 155 seconds.

The peak at 2850–2960 $cm^{-1}$ (normally two bands) corresponds to the stretching vibration of —$CH_2$— groups (see discussion of absorbance in polyethylene films). Such peaks are inherent to epoxy resins as well. The location the peak at 1250 $cm^{-1}$ is unambiguously inherent to the bending vibration of the epoxides groups:

The threshold value of intensity, that causes the decay of absorbance peaks, was established experimentally as 0.6–1 W. It is seen that epoxy resins are characterized by lesser levels of threshold powers necessary to decay absorbance peaks then the polyethylene.

It is suggested that the described changes in the absorbance spectra due to the laser irradiation are caused by oxygen-free thermal degradation of the polymers and breaking of the corresponding chemical bonds. A model for such a mechanism is given in the Appendix.

Although the examples include only two specific polymers it was found that the bleaching effect of one or more absorbance peaks in the IR, is common (at various threshold power of the $CO_2$ laser) to films of other kinds of polymers as well.

Among other polymers which were tested and show the effect were: polypropylene, polycarbonate, polystyrene, poly vinyl ester and polysulphone.

Figure 6A:
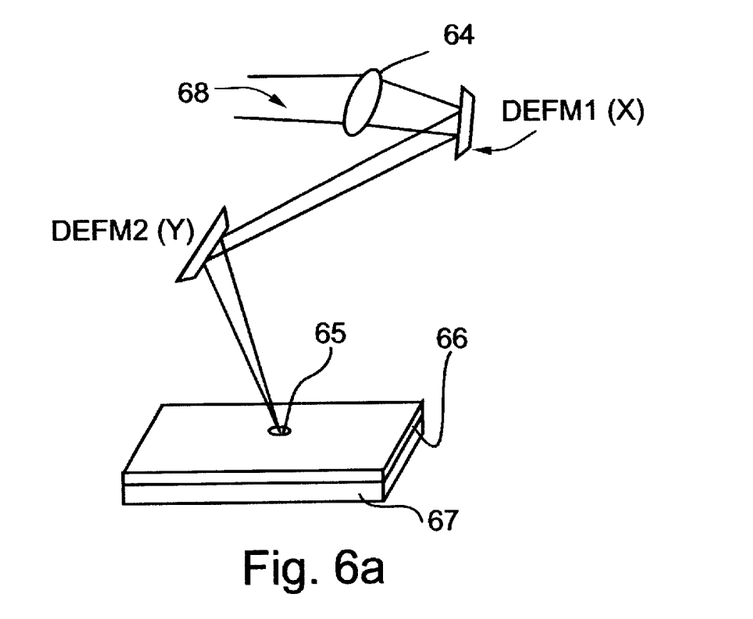
FIGS. 6A–6C show various setups suitable for optical writing and retrieval of a plurality of data in accordance with the present invention.

It will now be explained with reference to FIGS. 6A–6C how a recording and a reading of information within the recording medium in accordance with the present invention is carried out. FIG. 6A shows one mechanism for writing:

In FIG. 6A a polymeric layer 66, which is overlaid on a substrate 67 that is transparent in the IR is scanned by a writing beam focused to a spot 65 by lens 64. Spot 65 should be as small as possible but it can not be smaller then the wavelength of the writing beam 68, thus diameter of spot 65 of beam 68 which is produced by a $CO_2$ laser is about 10 $\mu$m.

Scanning the surface of the polymeric layer 66 with spot 65 over is accomplished by deflecting beam 68 using two deflection mirrors. DEFM1 and DEFM2 in the X and the Y direction of the plane of the polymeric film respectively.

Figure 6B:
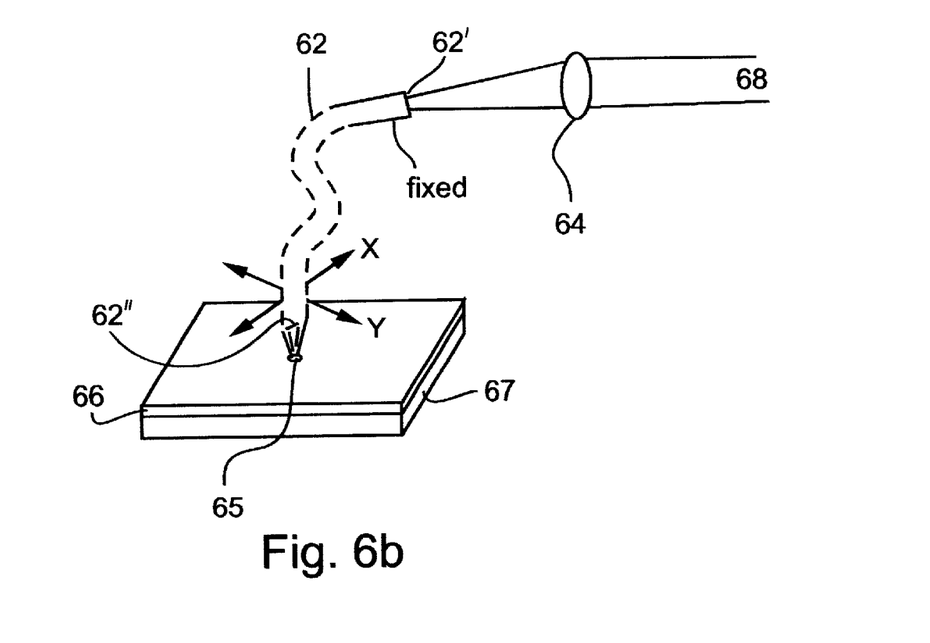

Alternatively in a second writing mechanism as shown in FIG. 6B; a converging IR beam 68 is led onto an entrance face 62' of waveguide 62. The relative lateral position of the polymeric film 66 and the exit face 62" of waveguide 62 are adjusted by a an X-Y translation manipulator (not shown), which translates either the lower part of (flexible) waveguide 62 or the polymeric film 66 in the X,Y directions, thus changing the location of illuminating spot 65 on film 66.

Figure 6C:
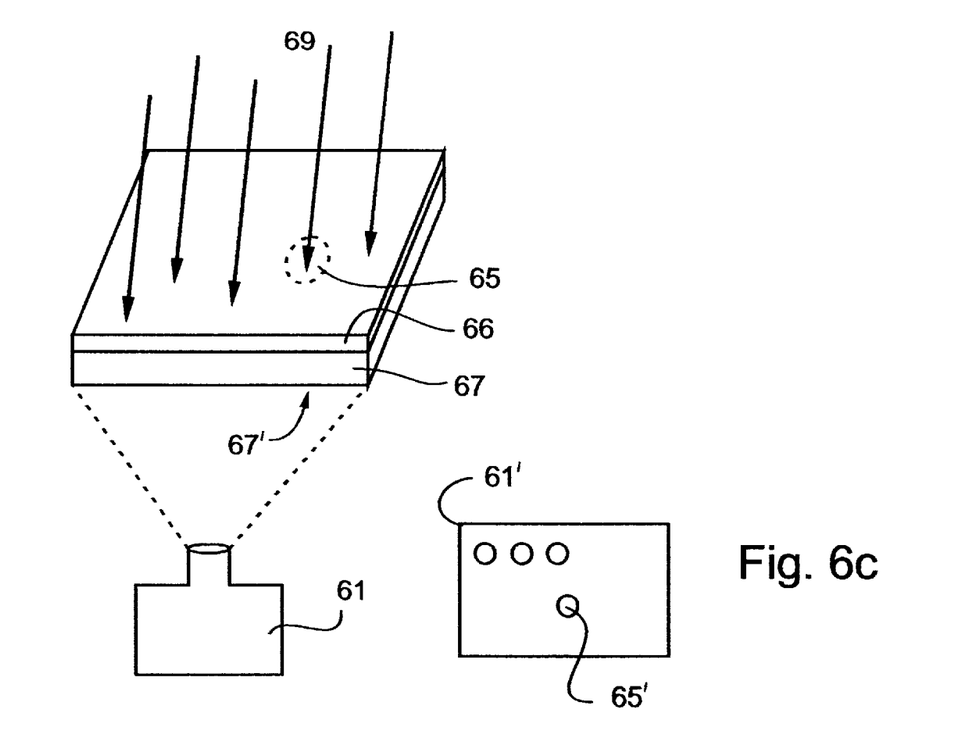

Reading of the recording can be done in a setup shown in FIG. 6C:

The surface of polymeric film 66 is flooded or scanned with a broad flat and uniform beam of monochromatic light 69 having a wavelength of at least one of the absorbance bands of the polymeric material of layer 66 which was affected by light beam 68. The substrate 67 is viewed from its opposite side 67' by an high resolution IR imager 61 which yields an image 61' of a spotted surface wherein the contrast of each spot 65' is related to the amount of the suppression of the absorbance band of the polymeric film at corresponding spot 65.

Accordingly, substrate 67 should be transmitting at least partially (e.g. no less than about 10%, absorbance=1) in wavelength of light beam 69 in order that enough of the transmitted light will arrive to imager 61. Light beam 68 is produced by an IR light source, preferably a $CO_2$ laser (not shown), operating in either a pulsed or a continuous mode having wavelengths of 9.6–10.8 $\mu$m. The intensity of the light beam of the laser at each dwelling point during the scan is modulated in accordance with a value of the data point being recorded at this location.

During the stage of recording the polymeric film has to be excluded from contact with oxygen in order to prevent its oxidation. One way to avoid this contact is to cover the exposed side of the polymeric film with a thin layer (not shown) of an oxygen impermeable, inert IR transparent material, which transmits at least as well as substrate 67 (about 10%, absorbance=1) in the wavelengths of light beam 69.

In addition this layer should also have a transmittance of about 50% (absorbance≈0.3) in the spectral range of about 9 $\mu$m to about 11 $\mu$m in order not to dissipate too much power of writing laser beam 68.

Such layers may be made of compact films of Ge, AgCl/AgBr, TlCl/TlBr (KRS-5), ZnS and other transparent materials known in the art of IR engineering.

While the principle of the invention has been described with respect to a limited number of embodiments, it will be appreciated that many variations, modifications and other applications of the invention may be made without departing from the spirit and scope of the invention.

For example, it should be emphasized that the separation of setups for writing and reading is not essential and was done here only for sake of clarity. Rather writing and reading can be accomplished at a single apparatus which combines the writing and reading facilities described above. Further more, as it may also be evident for readers familiar with the art, the light source of the writing light beam 68, e.g. a high pressure tunable $CO_2$ laser, can also provide light at wavelengths which corresponds to one of the possible wavelengths of a reading beam 69. In this case, it will be possible to use the same light beam (at different intensity levels) for both the writing and the reading.

The different threshold power needed for the bleaching effect at various absorption bands enables in principle to observe recordings in "two layers" at the same geometrical area of the medium. E.g., with polyethylene; confining first the writing beam power in between 2.5 to about 4.5 W will write only in the absorption band of 720 $cm^{-1}$. In this case, any noticed effect at the absorbance band of 2850–2960 cm$^{-1}$ will be attributed to a second recordation (on top of the first one), which was performed with light beams having higher power then 4.5 W.

It is also not necessary to use the full spectral range of light of the writing source. Rather it is possible to write with light having a selective wavelength provided by a $CO_2$ tunable laser, whenever this wavelength overlaps with the wavelength of one of the absorption bands of the polymeric layer.

In this case, the threshold value of power for modifying the absorption peak at this particular wavelength is reduced compared to the values of the "non tuned writing" cited previously.

Another aspect of the present invention may be in its application for laser marking of polymeric articles (like tags or thin personal cards) in the IR.

An "invisible" mark which includes bleaching of an absorption peak in the IR is embedded on a polymeric article by a $CO_2$ laser and this mark can be later be revealed by an appropriate instrumentation.

APPENDIX A

A thermal model for the suppression of absorbance bands of polymeric films in the IR by $CO_2$ laser irradiation.

We supposed that the changes in the absorbance spectra were caused by the oxygen-free thermal degradation of polymers and breaking of corresponding chemical bonds. In order to prove our assumptions, we estimated the temperature in the optical contact layer. We supposed that the steady state heat conductivity problem for the long rod, which has the internal heat source and at time cooled at the lateral face, describes the experimental situation adequately.

The system fiber - polymer layer could be described by this model, and adhesive layer plays the role of a heat source. Equations, which describe the heat transport process, could be written as:

$$\frac{d^2 T_g}{dx^2} = \frac{2\alpha_g}{\lambda_g R}(T_g - T_0) + \frac{W}{2\pi R^2 \xi \lambda_g}, \quad 0 \le x \le \xi \quad (1)$$

$$\frac{dT}{dx^2} = \frac{2\alpha}{\lambda R}(T - T_0) \; x \ge \xi \quad (2)$$

The boundary conditions are:

$$\frac{dT_g}{dx} = 0; \; x = 0 \quad (3a)$$

$$T = T_g; \; x = \xi \quad (3b)$$

$$\lambda_g \frac{dT_g}{dx} = \lambda \frac{dT}{dx}; \; x = \xi \quad (3c)$$

where, 2 10 m is the thickness of the polymer layer, and R=0.45 10$^{-3}$ m is the radius of the optical fiber, To≅293K is the ambient temperature, is the thermal conductivity coefficient, is the effective coefficient of heat exchange, W is the absorbed power and the index "g" relates to the adhesive layer. From equations (1)–(2) it can be seen that the characteristic length could be expressed as:

$$\Delta = \sqrt{\frac{\lambda R}{2\alpha}} \quad (4)$$

There is good reason to believe that the main mechanism of thermal exchange in our system is a heat radiation. From the above reasoning it can be concluded that:

$$\alpha = \varepsilon \sigma \frac{T_{eff}^4 - T_0^4}{T_{eff} - T_0} \quad (5)$$

where, ε<1 is the reduced emissivity of the system fiber-environment, σ is the constant of radiation, $T_{eff}$ is the effective temperature which gives the best approximation to the solution of the system (1)–(3). It can be seen that: $T_0 < T_{eff} < T(0)$.

It is felt that $T_{eff}$ 600° K (the characteristic temperature of oxygen-free polyethylene degradation), substituting $T_{eff}$ we receive Δ 3–4 10$^{-3}$ m; the corresponding constant τ could be expressed as:

$$\tau \cong \frac{\Delta^2}{a}; \quad (6)$$

The thermal diffusivity coefficient of AgCl equals α 5 10$^{-7}$ m$^2$/s. Substituting α and Δ in relationship (6) we receive 20s. It can be seen that the use of the steady-state model is proper. The characteristic time of radial heat exchange R could be calculated as:

$$\tau_R \cong \frac{R^2}{\Delta^2} \tau \cong \left(\frac{0.45}{3}\right)^2 \tau \cong 2 \cdot 10^{-2} \tau; \quad (7)$$

So we can assure ourselves that the use of the one-dimensional approach is legitimate as well. The final result for the temperature of the polymer layer doesn't depend on parameters of the adhesive (when absorbed power is fixed) and could be expressed as:

$$T(0) = T_0 + \frac{\sqrt{2}}{4\pi} \frac{w}{\sqrt{a\lambda R^3}}; \quad (8)$$

The thermal exchange coefficient depends on $T_{ef}$ which is in general unknown. FIG. (1) illustrates dependence $$T(0) = \frac{f(w)}{\sqrt{\varepsilon}};$$

when it was assumed that $T_{eff}$=(0).

What is claimed is:

1. An optical recording medium comprising:
   (a) a first transparent substrate having an optically flat face;
   (b) a recording layer which includes a polymeric film overlaid on said optically flat face of first transparent substrate; and
   (c) a second transparent substrate in contact with said polymeric film;
      wherein said second transparent substrate is at least partially transparent in a wavelength range from about 1 micrometer to about 20 micrometer and has an absorbance of at most about 0.3 at a wavelength range from about 9 micrometer to about 11 micrometer.

2. An optical recording medium as in claim 1 wherein said first transparent substrate is at least partially transparent in the wavelength range from about 1 micrometer to about 20 micrometer.

3. An optical recording medium as in claim 1 wherein said polymeric film has at least one absorbance peak in a spectral region from about 1 micrometer to about 20 micrometer.

4. An optical recording medium as in claim 1 wherein said polymeric film is selected from the group consisting of a thermoplastic polymer and a thermosetting polymer.

5. An optical recording medium as in claim 4 wherein said thermoplastic polymer is selected from the group which consists of polyethylene, polypropylene, polystyrene, polycarbonate and polysulfone.

6. An optical recording medium as in claim 4 wherein said thermosetting polymer is selected from the group consisting of poly-vinyl-ester and an epoxy resin.

7. An optical recording medium as in claim 1 wherein material of said first transparent substrate is selected from the group consisting of silver halide, thallium halide, zinc chalconide and germanium.

8. An optical recording medium as in claim 1 further comprising a mechanism for isolating said polymeric film from oxygen.

9. An optical recording medium as in claim 1 wherein material of said second transparent substrate is selected from the group consisting of silver halide, thallium halide, zinc chalconide and germanium.

10. An optical recording and retrieval system comprising:
(a) an optical recording medium having at least one absorption band in the spectral region from about 2 micrometer to about 20 micrometer;
(b) a first infra-red light source to irradiate on a selected portion of said optical recording medium; and
(c) a mechanism to determine changes in said at least one absorbance band at said irradiated portion of said optical recording medium.

11. A system as in claim 10 wherein said first infra-red light source includes a laser.

12. A system as in claim 11 wherein said laser is a $CO_2$ laser.

13. A system as in claim 12 wherein said $CO_2$ laser is a $CO_2$ tunable laser.

14. A system as in claim 12 wherein power of radiation at said selected portion of said optical recording medium by said $CO_2$ laser exceeds a threshold value.

15. A system as in claim 14 wherein said threshold value is about 0.5 W.

16. The system as in claim 10 further including:
(d) a mechanism for guiding a light beam from said first infra-red light source toward said optical recording medium.

17. The system of claim 16 wherein said mechanism for guiding said light beam toward said optical recording medium includes an infra-red optical fiber.

18. The system of claim 16 wherein said mechanism for guiding said light beam toward said optical recording medium includes a deflection mirror.

19. The system of claim 10 wherein area of said selected portion of said recording medium is confined to a spot.

20. The system of claim 19 wherein said spot has a diameter of at most about a wavelength of said first infra-red light source.

21. The system of claim 19 further comprising:
(d) a mechanism for changing a location of said spot on said optical recording medium.

22. The system of claim 21 wherein said mechanism for changing location of said spot on said optical recording medium includes a deflection mirror.

23. The system of claim 21 wherein said mechanism for changing location of said spot on said optical recording medium includes an infra-red optical fiber.

24. The system of claim 21 wherein said mechanism for changing location of said spot on said optical recording medium includes a mechanism for moving of said optical recording medium relative to a focal point of a light beam of said first light source.

25. The system as in claim 10 wherein said mechanism of determining said change in said at least one absorption band includes:
(i) a second infra-red light source to provide light which includes a wavelength within said at least one absorption band; and
(ii) a device to measure an intensity of said light at said wavelength.

26. The system as in claim 25 wherein said second infra-red light source includes a tunable infra-red laser.

27. The system as in claim 25 wherein said measuring device is selected from the group consisting of infra-red power meters, infra-red detectors, infra-red spectrophotometers and infra-red imagers.

28. The system of claim 25 wherein said mechanism of determining said change in said at least one absorption band further includes:
(iii) a mechanism for guiding a light beam from said second infra-red light source toward said optical recording medium.

29. The system of claim 28 wherein said mechanism for guiding said light beam toward said optical recording medium includes an infra-red optical fiber.

30. The system of claim 28 wherein said mechanism for guiding said light beam toward said optical recording medium includes a deflection mirror.

31. A method for optical recording and retrieval of a plurality of data points comprising the steps of:
(a) providing a polymeric layer having at least one absorbance peak in the spectral region from about 1 micrometer to about 20 micrometer, for each data point;
(b) producing a light pulse having a power related to a value of said each data point; and
(c) changing said at least one absorbance peak of said polymeric layer by irradiating a respective portion of said polymeric layer with said light pulse.

32. The method of claim 31 wherein said light pulse has a wavelength in the spectral range from about 1 micrometers to about 20 micrometers.

33. The method of claim 32 wherein said light pulse is effective to bleach said respective portion of said polymeric film if said power of said light pulse exceeds a threshold value.

34. The method of claim 33 wherein said threshold value is about 0.5 W.

35. The method of claim 31 wherein said polymeric layer has at least one absorbance peak in a spectral region from about 1 micrometer to about 20 micrometer.

36. The method of claim 31 wherein material of said polymeric layer is selected from the group consisting of a thermoplastic polymer and a thermosetting polymer.

37. The method of claim 36 wherein said thermoplastic polymer is selected from the group which consists of polyethylene, polypropylene, polystyrene, polycarbonate and polysulfone.

38. The method of claim 36 wherein said thermosetting polymer is selected from the group consisting of poly-vinyl-ester and an epoxy resin.

39. The method of claim 31 wherein said respective portion of said polymeric layer is confined to a spot.

40. The method of claim 39 further comprising:
(d) moving said spot on said polymeric layer.

41. The method of claim 39 wherein diameter of said spot is about a wavelength of said light pulse.

42. The method of claim 39 wherein at least two of said spots corresponding to at least two of said data points respectively have a same location on the said polymeric film.

43. The method of claim 31 further comprising the steps of:
(d) determination an amount of said changing of said at least one absorbance peak at said irradiated portion of said polymeric layer.

44. The method of claim 43 wherein said determination includes:
(i) transmitting a second beam of light through said polymeric film and
(ii) measuring an attenuation of said transmitted beam.

45. The method of claim 44 wherein said attenuation measurement is effected with a device selected from the group consisting of infra-red power meters, infra-red detectors, infra-red spectrophotometers and infra-red imagers.

46. The method of claim 44 wherein said first beam of light and said second beam of light have substantially the same wavelength.

47. The method of claim 44 wherein said first beam of light and said second beam of light originate from a common source of light.

48. A method for optical marking and authentication of articles in the IR comprising the steps of:
(a) providing an article which includes a polymeric layer having at least one absorbance peak in the spectral region from about 1 micrometer to about 20 micrometer;
(b) irradiating a portion of said polymeric layer with an IR light beam of a $CO_2$ laser to bleach said at least one absorbance peak and,
(c) detecting said bleaching of at least one absorbance peak.

* * * * *